Figure 1:
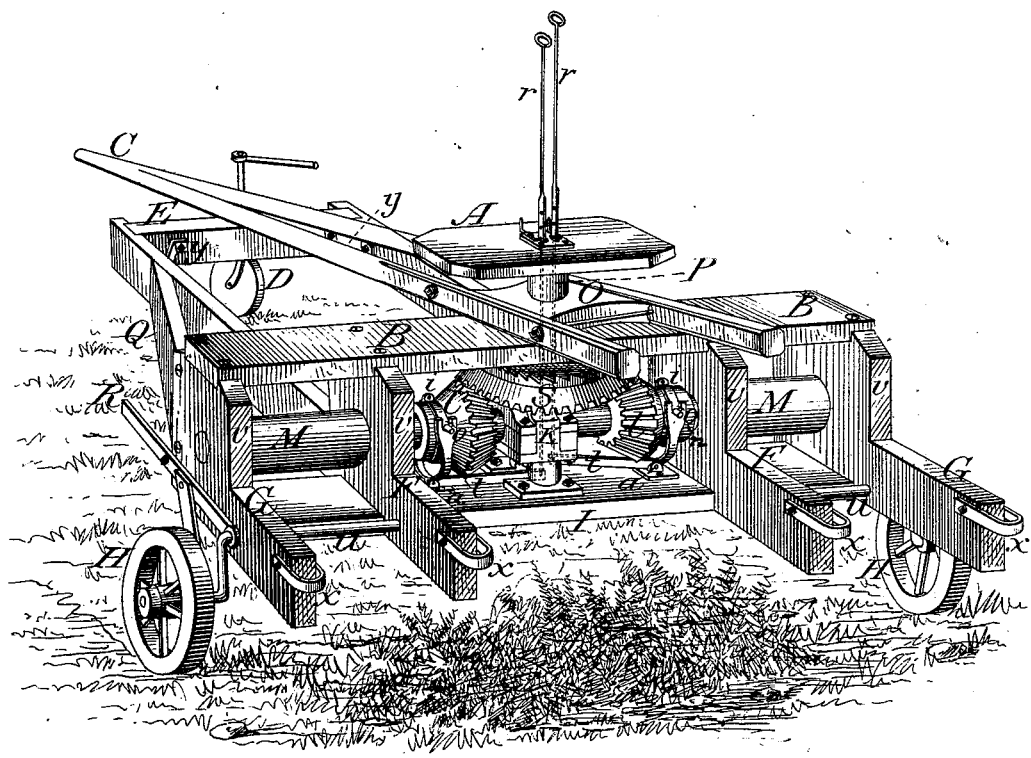

2 Sheets—Sheet 1.

S. G. McCANN.
Grubbing-Machine.

No. 218,127.   Patented Aug. 5, 1879.

Attest:   Inventor:

Benjamin Lee Arnold
Benjamin James Hawthorne   Shubael Garner McCann

N. PETERS, PHOTO-LITHOGRAPHER, WASHINGTON, D. C.

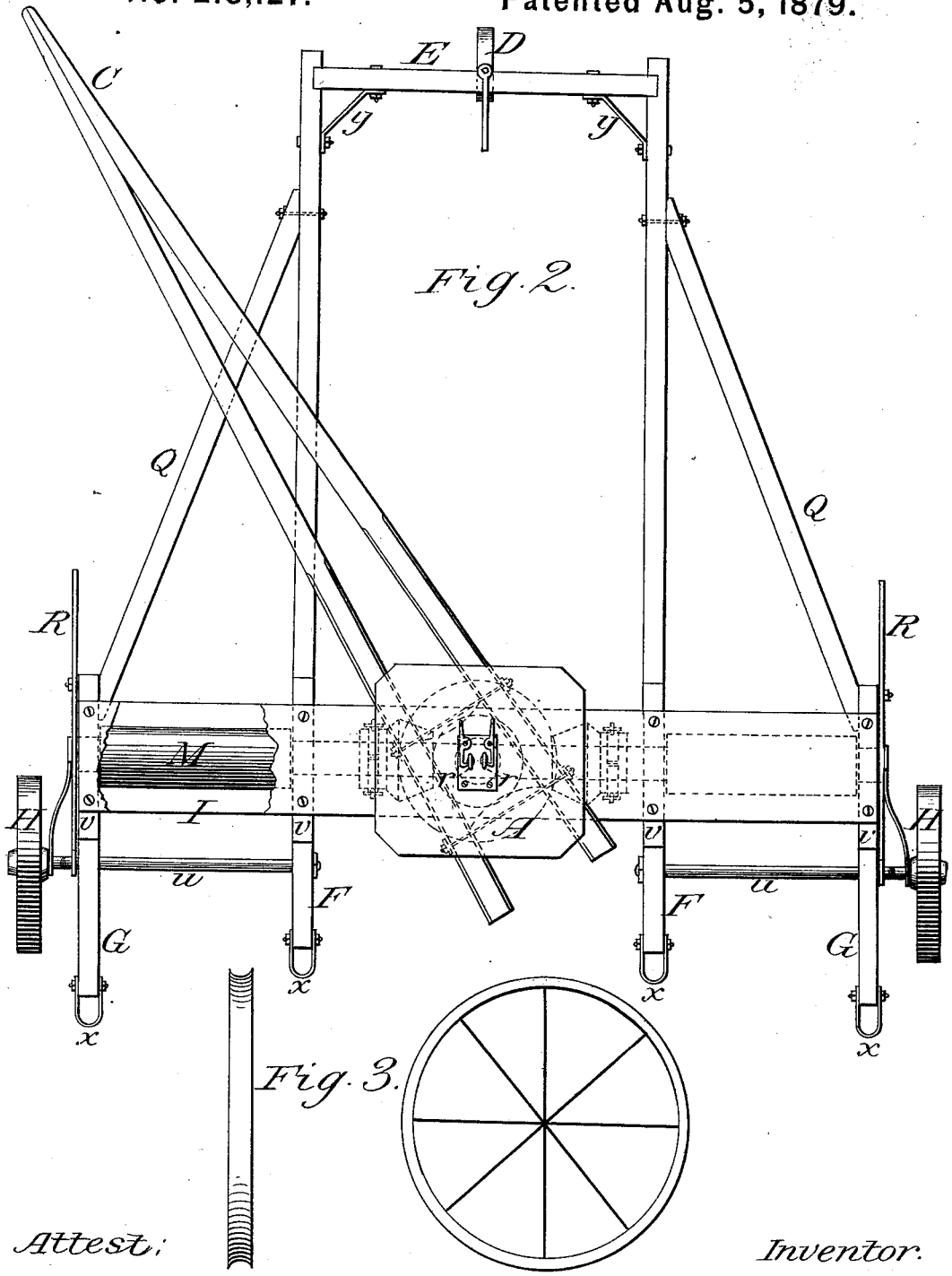

UNITED STATES PATENT OFFICE.

SHUBAEL G. McCANN, OF CORVALLIS, OREGON.

IMPROVEMENT IN GRUBBING-MACHINES.

Specification forming part of Letters Patent No. 218,127, dated August 5, 1879; application filed December 23, 1878.

*To all whom it may concern:*

Be it known that I, SHUBAEL GARNER MC-CANN, of Corvallis, county of Benton, State of Oregon, have invented a new and useful Improvement in Grubbing-Machines, of which the following is a specification.

The invention relates to grubbing-machines, for pulling up grubs.

The object of my invention is to construct a machine for pulling up grubs that can be adapted to the work and operated with little loss of time and labor, and that is durable and strong.

The invention consists of a wooden frame with two solid cast-iron rollers cast upon a wrought-iron shaft, upon which work bevel-gear pinions. The pinions are made to fit loosely upon the shafts, so that they can be moved freely to and fro, so as to gear and ungear with the larger bevel-gear or master wheel. The master-wheel rests upon a cast-iron seat, in which is inserted a hollow shaft. The hollow shaft passes up through the master-wheel and forms an axis for the master-wheel. The hollow shaft also extends above the stem of the master-wheel enough to admit a flange for a platform. It also consists of wheels to move the machine upon. They are provided with rod-iron axles, bent in the shape of a crank, that by turning them half around the machine may be lowered on the ground.

In the accompanying drawings similar letters indicate like parts.

Figure 1 is a perspective of the device embodying my invention. Fig. 2 is a detail view of the same, and Fig. 3 represents the wheel with its recess in the rim.

The machine is mounted and moved upon the wheels H and guide-wheel D. The master-wheel S works on the hollow shaft P, and upon the iron wheel-seat K for a bearing. The hollow shaft is fixed substantially in the wheel-seat, which hollow extends to the crotch of the wheel-seat K. The wheel-seat K is bolted substantially to the bottom piece, I, of the frame. The master-wheel S also works in iron boxing, lined with Babbitt metal, through top piece, B, and extends above to admit the iron collar O of the sweep C, which works above the machine clearly. The hollow shaft P extends still above to admit the platform A, the platform not being disturbed by the sweep when the machine is at work. The rollers M rest upon the timbers F and G, in iron and Babbitt-metal boxing, and substantially secured by the pieces of timbers $v$. The journals are prepared with feather-keys $x$, to keep the pinions $l$ from turning on the shafts. The ends of the shafts are steadied in boxing $n$. The pinions have collars $i$, fitting loosely in their grooves, so as to allow the pinions to turn freely in them. The collars have on each lateral side a knob, that works in the fork $o$ of the levers $t$, the levers $t$ being bent at right angles, and at the angles there are holes, and pins inserted for them to cant upon. The perpendicular ends straddle the pinions $l$ and intersect with the knobs of the collars $i$, while the other ends extend horizontally till they meet under the wheel-seat K, which ends are attached to the rods $r$, passing down through the platform A and hollow shaft P. The bottom piece, I, is let in the timbers F and G flush with the under edge of the timbers. The frame is substantially bolted together with bolts passing up through the timbers $F^v$ and $G^v$ and top piece, B. The timbers F are fastened together at the rear end of the machine by the cross-piece, bolted, and also by corner-braces $y$. The frame is strengthened with the braces $u\ u$, which are bolted to the pieces F near the rear end, and join the pieces $G^v$ and F substantially together.

The machine is provided with wheels H and the guide-wheel D. The wheels H have levers R attached to their axles $u$, which hold the axles in the proper position when traveling by bolts passing through the levers and timbers G. The machine is provided with chains and ropes. Chains are attached to the rollers M by means of hooks screwed in the side of rollers, near the ends. The chains attached to the rollers, after the rollers have been covered with the chain wound around them, extend outside of the track made by the horse in walking around the machine, and also short chains used to attach to the grubs, but all intermediate distances to be supplied with rope. The chains are kept parallel to each other, and at right angles to the rollers, till they reach outside of the track by pulleys fastened in a piece of wood which is staked to the ground firmly. From there the ropes may take any direction. At the ends of the ropes, and near the grub, a wheel is used. The rope is passed over the top of the wheel, and attached to the grub lower than the top of the wheel, so as to give the rope a lifting-power on the grub.

The operation of the machine is as follows: The machine is first brought to a suitable distance with respect to the work. It is then lowered on the ground. This is done by lifting the rear end off of the guide-wheel D, then loosening the bolts that hold the levers R, and bringing them forward till they are in an inversed position. Then the machine is on the ground. Then the machine must be well staked to the ground by placing the stakes in the front loops, $x$, and two at the rear end in the corners $y$. The horse is hitched to sweep C, and the operator takes his position on the platform A. The ropes attached to the grubs, the horse is started, and the operator pushes down the rods $n$, and they also push the pinions in mesh with master-wheel S. The ropes being shortened by winding the chains on the rollers M, the grubs are dislocated. Then the operator pulls up on the rods $n$, throwing the pinions $l$ back upon their shafts $w$ and out of mesh with the master-wheel S. It not being necessary to stop the horse to attach or detach ropes to the grubs, he may be continually moving, while the men in the field may, by pulling on the ropes, unwind them from off the rollers and attach them, as before described. The rollers may be used simultaneously or alternately—i. e., both ropes may be attached to their respective grubs at the same time, or one attached while the other is pulling.

What I claim is—

1. The combination of two rollers with movable pinions on the shafts of said rollers, in combination with gear-wheel S, working upon a hollow shaft as its axis, substantially as described.

2. Hollow shaft with the wheel-seat K, in combination with gearing mechanism operated by rods passing through the hollow shaft P and attached to the levers $t$, in combination with movable pinions, substantially as set forth.

3. A platform, A, attached to the top end of hollow shaft P, and gearing mechanism independent of each other, as described.

4. The combination of wheels with crank-shaped axles, with levers attached to said axles, for the purpose of mounting and dismounting the machine, as described.

SHUBAEL G. McCANN.

Witnesses:
BENJAMIN LEE ARNOLD,
BENJAMIN JAMES HAWTHORNE.